United States Patent
Han et al.

(10) Patent No.: US 9,871,259 B2
(45) Date of Patent: Jan. 16, 2018

(54) METHOD FOR MANUFACTURING COMPOSITE CERAMIC MATERIAL

(71) Applicant: POSCO, Pohang (KR)

(72) Inventors: Sang-Moo Han, Gyeongsangbuk-do (KR); Do-Hyeong Kim, Gyeongsangbuk-do (KR); Joong-Hwan Jun, Gyeongsangbuk-do (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 15/198,318

(22) Filed: Jun. 30, 2016

(65) Prior Publication Data

US 2016/0329573 A1    Nov. 10, 2016

Related U.S. Application Data

(62) Division of application No. 13/519,699, filed as application No. PCT/KR2010/009442 on Dec. 28, 2010, now abandoned.

(30) Foreign Application Priority Data

Dec. 28, 2009   (KR) .................. 10-2009-0131639

(51) Int. Cl.
    *H01M 8/0217*     (2016.01)
    *C01G 45/12*      (2006.01)
    (Continued)

(52) U.S. Cl.
    CPC ........... *H01M 8/0217* (2013.01); *B82Y 30/00* (2013.01); *C01G 45/12* (2013.01); *C01G 51/006* (2013.01);
    (Continued)

(58) Field of Classification Search
    CPC ........... H01M 8/00; H01M 4/00; B82Y 30/00; C01G 45/00; C01G 51/00; C01G 53/00;
    (Continued)

(56) References Cited

U.S. PATENT DOCUMENTS

| 3,602,619 A | 8/1971 | Van der Tas et al. |
| 4,636,248 A | 1/1987 | Ogata et al. |

(Continued)

FOREIGN PATENT DOCUMENTS

| CN | 1715239 A   | 1/2006 |
| CN | 101307461 A | 11/2008 |

(Continued)

OTHER PUBLICATIONS

Popa et al., "Lanthanum cobaltite nanoparticles using the polymeric precursor method", Available online Feb. 23, 2009, Journal of the European Ceramic Society, 2000, pp. 2281-2287, vol. 29.

(Continued)

*Primary Examiner* — David Turocy
*Assistant Examiner* — Mohammad Mayy
(74) *Attorney, Agent, or Firm* — The Webb Law Firm

(57) ABSTRACT

Provided is a method of making a composite ceramic material for a fuel cell. The composite ceramic material for the fuel cell forms a cored structure where perovskite ceramic particles having a small particle diameter surround lanthanum cobaltite particles having a large particle diameter. Lanthanum cobaltite is added as a starting material in a process of synthesizing the perovskite ceramic particles. The composite ceramic material for the fuel cell made according to this method improves an electric connection characteristic between a separation plate and a polar plate of the fuel cell, and is chemically and mechanically stable.

11 Claims, 3 Drawing Sheets

(51) Int. Cl.

| | | |
|---|---|---|
| *C01G 51/00* | (2006.01) | |
| *C01G 53/00* | (2006.01) | |
| *C04B 35/01* | (2006.01) | |
| *C04B 35/626* | (2006.01) | |
| *C04B 35/628* | (2006.01) | |
| *H01M 8/0236* | (2016.01) | |
| *B82Y 30/00* | (2011.01) | |
| *H01M 4/86* | (2006.01) | |
| *H01M 4/90* | (2006.01) | |
| *C04B 35/50* | (2006.01) | |
| *C04B 35/624* | (2006.01) | |
| *C04B 35/64* | (2006.01) | |
| *H01M 8/124* | (2016.01) | |

(52) U.S. Cl.
CPC .......... *C01G 51/70* (2013.01); *C01G 53/006* (2013.01); *C01G 53/70* (2013.01); *C04B 35/01* (2013.01); *C04B 35/50* (2013.01); *C04B 35/624* (2013.01); *C04B 35/62685* (2013.01); *C04B 35/62805* (2013.01); *C04B 35/62826* (2013.01); *C04B 35/62892* (2013.01); *C04B 35/64* (2013.01); *H01M 4/8657* (2013.01); *H01M 4/9033* (2013.01); *H01M 8/0236* (2013.01); *C01P 2002/34* (2013.01); *C01P 2004/03* (2013.01); *C01P 2004/61* (2013.01); *C01P 2004/62* (2013.01); *C01P 2004/82* (2013.01); *C01P 2004/84* (2013.01); *C01P 2006/40* (2013.01); *C04B 2235/3208* (2013.01); *C04B 2235/3227* (2013.01); *C04B 2235/3241* (2013.01); *C04B 2235/3275* (2013.01); *C04B 2235/3281* (2013.01); *C04B 2235/443* (2013.01); *C04B 2235/449* (2013.01); *C04B 2235/528* (2013.01); *C04B 2235/5436* (2013.01); *C04B 2235/5454* (2013.01); *C04B 2235/768* (2013.01); *C04B 2235/9615* (2013.01); *H01M 2008/1293* (2013.01); *Y02P 70/56* (2015.11)

(58) Field of Classification Search
CPC ..... C04B 35/00; C04B 2235/00; Y02P 70/00; C01P 2002/00
See application file for complete search history.

(56) References Cited

U.S. PATENT DOCUMENTS

| | | |
|---|---|---|
| 4,861,345 A | 8/1989 | Bowker et al. |
| 5,549,850 A | 8/1996 | Garrigus |
| 6,399,233 B1 | 6/2002 | Milliken et al. |
| 6,835,684 B2 | 12/2004 | Tietz et al. |
| 8,343,685 B2 | 1/2013 | Hansen et al. |
| 2001/0046603 A1* | 11/2001 | Constantino ......... C01G 23/003 428/403 |
| 2002/0155335 A1 | 10/2002 | Kearl |
| 2006/0104008 A1 | 5/2006 | Wood et al. |
| 2008/0269042 A1 | 10/2008 | Carty |
| 2009/0011307 A1 | 1/2009 | Lee et al. |
| 2009/0280376 A1 | 11/2009 | Chiba et al. |
| 2010/0216047 A1 | 8/2010 | Marlin et al. |
| 2011/0082030 A1* | 4/2011 | Kim ...................... B01J 23/002 502/303 |

FOREIGN PATENT DOCUMENTS

| | | |
|---|---|---|
| CN | 101533935 A | 9/2009 |
| CN | 101567447 A | 10/2009 |
| DE | 19627504 C1 | 10/1997 |
| EP | 0669296 B1 | 8/1995 |
| EP | 1337496 B1 | 8/2007 |
| JP | 63144116 A | 6/1988 |
| JP | 4219365 A | 8/1992 |
| JP | 5074352 A | 3/1993 |
| JP | 5266903 A | 10/1993 |
| JP | 6345518 A | 12/1994 |
| JP | 6349504 A | 12/1994 |
| JP | 7237905 A | 9/1995 |
| JP | 2000200614 A | 7/2000 |
| JP | 2001097789 A | 4/2001 |
| JP | 2002352808 A | 12/2002 |
| JP | 2004265742 A | 9/2004 |
| JP | 200787612 A | 4/2007 |
| JP | 200916350 A | 1/2009 |
| JP | 2010517246 A | 5/2010 |
| WO | 2008092608 A1 | 8/2008 |

OTHER PUBLICATIONS

Faaland et al., "Reactions between Calcium-and Strontium-Substituted Lanthanum Cobaltite Ceramic Membranes and Calcium Silicate Sealing Materials", Chem. Mater., 2001, pp. 723-732, vol. 13.

Kleveland et al., "Sintering of LaCoO3 based ceramics", Journal of the European Ceramic Society, 2000, pp. 185-193, vol. 20.

Deng et al., "Strontium-Doped Lanthanum Cobaltite and Maganite: Highly Active Catalysts for Toluene Complete Oxidation", Ind. Eng. Chem., 2008, pp. 8175-8183, vol. 47.

* cited by examiner

METHOD FOR MANUFACTURING COMPOSITE CERAMIC MATERIAL

CROSS-REFERENCE TO RELATED APPLICATION

This application is a divisional of, and claims priority to, U.S. patent application Ser. No. 13/519,699, filed on Dec. 28, 2010, which claims priority to Korean Patent Application No. 10-2009-0131639, filed on Dec. 28, 2009, the disclosures of which are hereby incorporated by reference.

BACKGROUND OF THE INVENTION (a) Field of the Invention

The present invention relates to a fuel cell, and more particularly, to a composite ceramic material electrically connecting an anode and a separation plate of a fuel cell, and a method for manufacturing the same.

(b) Description of the Related Art

Among fuel cells, if a solid oxide fuel cell (SOFC) is described as an example thereof, the fuel cell is formed of a structure where a plurality of electric generating units formed of a unit cell and a separation plate are laminated. The unit cell includes an electrolyte film, an anode (air electrode) disposed on one surface of the electrolyte film, and a cathode (fuel electrode) disposed on another surface of the electrolyte film.

If oxygen is supplied to the anode and hydrogen is supplied to the cathode, oxygen ions generated by a reduction reaction of oxygen at the anode are transported through the electrolyte film to the cathode, and then reacted with hydrogen supplied to the cathode to generate water. In this case, in the course of transporting the electrons generated at the cathode to the anode to be consumed, the electrons flow to an external circuit, and the unit cell generates consumed, the electrons flow to an external circuit, and the unit cell generates electrical energy by using the flow of electrons.

In the case of the solid oxide fuel cell, since electrical energy generated by one unit cell has a limitation, generally, a stack structure where a plurality of unit cells is laminated is formed.

In each unit cell having the stack structure, a separation plate electrically connecting the anode and the cathode and preventing gases from being mixed is generally used.

Generally, a stainless steel plate is used as the separation plate, the separation plate provides a gas flow path to the anode (air electrode) and also provides a gas flow path to the cathode (fuel electrode).

One of the methods of improving performance in the solid oxide fuel cell is to reduce electrical resistance of the stack, that is, internal resistance of the fuel cell.

To this end, a constitution where a material having excellent electric conductivity is used as the material of the separation plate and the polar plate or contact electrical resistance thereof is reduced has been proposed. An example thereof includes the case where a current collector transporting current is inserted between the anode and the separation plate and a platinum mesh (Pt mesh) is used as the current collector. Examples of another method include the case where an antioxidant metal mesh is used instead of platinum in order to reduce cost.

However, in the case where the metal material is used as the current collector, when the material is exposed to an oxidizing atmosphere over a long period of time, there is a problem in that oxides are formed on a surface thereof to increase resistance of a stack, thus deteriorating performance of the stack.

Accordingly, it is required that oxides that are stable and exhibits conductivity even in an oxidizing atmosphere are adopted to ensure stable performance even when a stack is operated over a long period of time.

A ceramic material having a perovskite structure is known as a contact material electrically connecting the polar plate and the separation plate of the fuel cell.

However, in the case of the perovskite ceramic material, physical properties of the material need to be further improved so that electrical conductivity is further improved and the material is chemically and mechanically stable.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a composite ceramic material that improves an electric connection between a separation plate and a polar plate of a fuel cell maintained in an oxidizing atmosphere and is chemically and mechanically stable.

Further, the present invention has been made in an effort to provide a method for manufacturing a composite ceramic material that improves an electric connection between a separation plate and a polar plate of a fuel cell maintained in an oxidizing atmosphere and is chemically and mechanically stable.

An exemplary embodiment of the present invention provides a composite ceramic material including: fine $ABO_3$ type perovskite ceramic particles compositely synthesized with lanthanum cobaltite ($LaCoO_3$) particles having a particle diameter that is larger than a particle diameter of the perovskite ceramic particle.

It is preferable that the composite ceramic material form a cored structure where the perovskite ceramic particles surround the lanthanum cobaltite particles, and that the lanthanum cobaltite be synthesized by being added with a starting material in a process of synthesizing the perovskite ceramic particles.

In the composite ceramic material, it is preferable that a ratio of the lanthanum cobaltite be greater than 10 wt % and less than 90 wt %. Further, in the composite ceramic material, it is preferable that the perovskite ceramic particle be any one of $(La,Sr)MnO_3$, $(La,Sr)CoO_3$, $(La,Sr)(Co,Fe)O_3$, and $(La,Ca)(Cr,Co,Cu)O_3$, and the particle diameter thereof be 100 nm or less. It is more preferable that a composition of the perovskite ceramic be $(La_{0.8}Ca_{0.2})(Cr_{0.1}Co_{0.6}Cu_{0.3})O_3$.

In addition, in the composite ceramic material, it is preferable that a particle diameter of the lanthanum cobaltite particle be 0.5 to 5.0 μm and the lanthanum cobaltite particle have a sphere shape.

Another exemplary embodiment of the present invention provides a method for manufacturing a composite ceramic material, including: i) adding a mixture where citric acid and lanthanum cobaltite powder are mixed with each other to a nitrate aqueous solution where a plurality of nitrates are dissolved; ii) heating and agitating the aqueous solution to convert a reactant from a sol state to a gel state; iii) heating the reactant produced in the heating and agitating to a temperature of self-ignition or more of the citric acid to combust the citric acid; and iv) pulverizing chars produced in the combusting the gel and then heat treating and calcining the chars at 700° C. or more.

In the method for manufacturing the composite ceramic material, it is preferable that a particle diameter of the lanthanum cobaltite powder be 0.5 to 5.0 μm, and a ratio of the lanthanum cobaltite added to the nitrate aqueous solution be greater than 10 wt % and less than 90 wt %.

Further, the nitrate aqueous solution is obtained by dissolving at least one metal nitrate selected from lanthanum nitrate, calcium nitrate, chrome nitrate, cobalt nitrate, copper nitrate, iron nitrate, bismuth nitrate, yttrium nitrate, manganese nitrate, strontium nitrate and nickel nitrate in distilled water to correspond to a composition of a $ABO_3$ perovskite ceramic.

Herein, it is preferable that the $ABO_3$ perovskite ceramic be any one of $(La,Sr)MnO_3$, $(La,Sr)CoO_3$, $(La,Sr)(Co,Fe)O_3$, and $(La,Ca)(Cr,Co,Cu)O_3$. It is preferable that a composition of the $(La,Ca)(Cr,Co,Cu)O_3$ be $(La_{0.8}Ca_{0.2})(Cr_{0.1}Co_{0.6}Cu_{0.3})O_3$.

In addition, it is preferable that the citric acid be used as a combustible organic material contributing to forming a metal complex and forming ceramic powder by combustion at high temperatures, and the combustible organic material be any one of glycine nitrate, polyethylene glycol, urea and ethylenediamine tetraacetate.

Furthermore, the method for manufacturing the composite ceramic material for the fuel cell according to the exemplary embodiment of the present invention further includes uniformly mixing the calcined powder, a combining material, a dispersion material and a solvent to manufacture a viscous fluid (slurry).

The method for manufacturing the composite ceramic material according to the exemplary embodiment of the present invention further includes applying the manufactured viscous fluid on a polar plate or a separation plate of a fuel cell and then sintering the viscous fluid. In this case, it is preferable that the sintering be performed at 600° C. or more for 1 hour or more.

Yet another exemplary embodiment of the present invention provides a fuel cell including: a polar plate or a separation plate coated with the composite ceramic material manufactured by the aforementioned method.

Still another exemplary embodiment of the present invention provides a fuel cell including i) a unit cell formed of an electrolyte film, an anode (air electrode) disposed on one surface of the electrolyte film, and a cathode (fuel electrode) disposed on another surface of the electrolyte film; and ii) a separation plate electrically connecting the anode and the cathode and coated with the composite ceramic material.

According to exemplary embodiments of the present invention, the manufactured composite ceramic material has excellent electrical conductivity at an operation temperature of a fuel cell and exhibits a technical effect of maintaining a chemically stable state.

DESCRIPTION OF THE INVENTION

Figure 1:
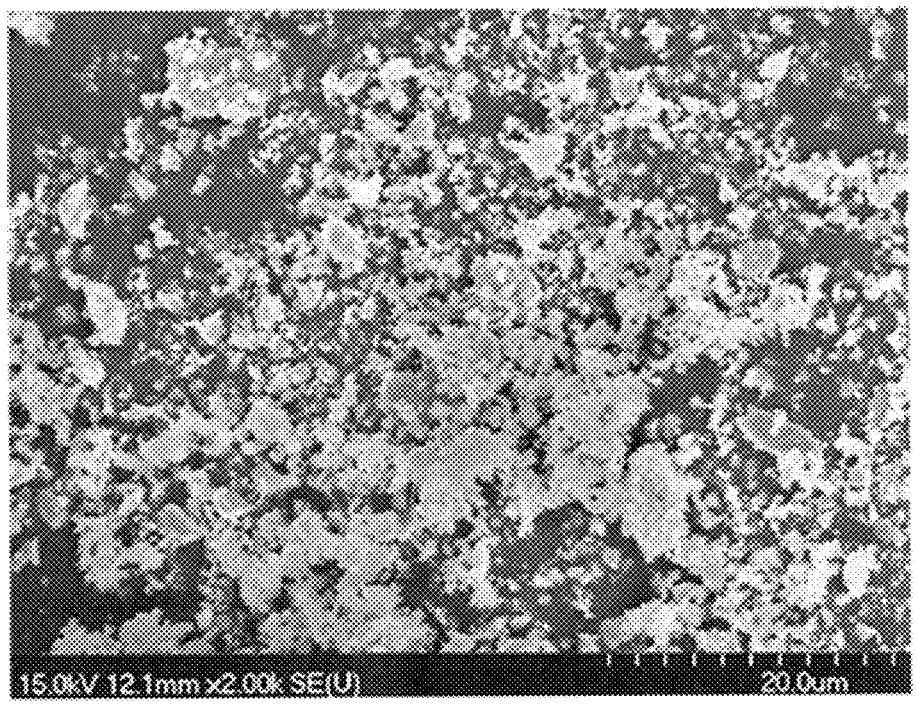
FIG. 1 is a scanning electron microscope picture of a lanthanum cobaltite powder used to manufacture a composite ceramic material for a fuel cell according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A composite ceramic material described below is mainly described by a solid oxide fuel cell as an example thereof in the present specification, but the present invention is not limited thereto and applied to all cells using the composite ceramic material.

In the composite ceramic material according to the exemplary embodiment of the present invention, fine $ABO_3$ perovskite ceramic particles are compositely formed together with lanthanum cobaltite ($LaCoO_3$) particles having a relatively large particle diameter. Preferably, a so-called cored structure where the fine $ABO_3$ perovskite ceramic particles surround the lanthanum cobaltite particles having a large particle diameter is formed.

The composite ceramic material is manufactured by firstly dissolving nitrates in water to manufacture a nitrate aqueous solution and then mixing and heating the nitrate aqueous solution, citric acid and lanthanum cobaltite powder.

Hereinafter, a starting raw material for manufacturing the composite ceramic material according to the exemplary embodiment of the present invention will be described.

First, the nitrate aqueous solution is manufactured by dissolving at least one metal nitrate selected from lanthanum nitrate, calcium nitrate, chrome nitrate, cobalt nitrate, copper nitrate, iron nitrate, bismuth nitrate, yttrium nitrate, manganese nitrate, strontium nitrate and nickel nitrate in distilled water.

In this case, the composition of nitrate dissolved in distilled water is stoichiometrically determined to correspond to the composition of the $ABO_3$ perovskite ceramic. That is, the composition ratio of added metal nitrate is determined according to the composition of the finally formed conductive perovskite ceramic.

Examples of the composition of the finally formed perovskite ceramic include $(La,Sr)MnO_3$, $(La,Sr)CoO_3$, $(La,Sr)(Co,Fe)O_3$, $(La,Ca)(Cr,Co,Cu)O_3$ and the like.

Next, the citric acid that is the starting raw material acts as a 'fuel' for combustion synthesis. Accordingly, the combustible organic material contributing to forming a metal complex such as glycine nitrate, polyethylene glycol, urea and ethylenediamine tetraacetate and forming ceramic powder by combustion at high temperatures may be used. Further, the other organic material, for example, ethylenediamine tetraacetate may be used with citric acid and ammonia water. However, since the citric acid can act alone as a metal complex forming agent and a fuel, it is preferable to use the citric acid.

The addition ratio of the citric acid is determined according to the ratio of cations in the nitrate aqueous solution. In more detail, the oxidizing amount of nitrate and the oxidizing amount of the citric acid are determined to correspond to each other. The oxidizing amount may be generally an atomic valency of an element, but in the case of a rapid redox reaction, that is, in the case where the ceramic is synthesized through a combustion process, the meaning thereof is slightly changed.

For example, the oxidizing amount of La is +3, the oxidizing amount of oxygen (O) is −2, that of carbon (C) is +4, and that of hydrogen (H) is +1, but since nitrogen (N) is considered to be inert, the oxidizing amount thereof is 0.

Accordingly, the oxidizing amount of each nitrate is determined according to this method, and the oxidizing amount of the mixture may be calculated according to a molar ratio.

The citric acid having the oxidizing amount of the quantity corresponding to the quantity of the negative oxidizing amount of the nitrate mixture calculated as described above is used as the fuel. However, when the ratio of the citric acid that is the fuel is slightly larger, since a combustion reaction is smooth to improve physical properties of the manufactured ceramic powder, it is preferable to increase the ratio of the citric acid. The increase amount is changed according to the composition of the synthesized perovskite.

Next, it is preferable that a particle diameter of lanthanum cobaltite that is another starting raw material be 0.5 to 5.0 μm and lanthanum cobaltite be dense and spherical powder where there is no pore between primary particles.

The spherical lanthanum cobaltite powder is manufactured by mixing lanthanum oxides and cobalt oxides, heating the mixture at the temperature of 1400° C. or more for 5 hours or more to perform synthesis, and pulverizing the mixture.

A method of forming a precursor by using cellulose and combusting the precursor may be used as another method of manufacturing lanthanum cobaltite powder. Examples of another method of manufacturing lanthanum cobaltite powder include a method of dissolving metal chlorides, citric acid and ethylene glycol in water to form an aqueous solution, removing water and an organic material by heating, and performing heat treatment at 400° C. or more.

Examples of another method of manufacturing lanthanum cobaltite powder include a method of manufacturing lanthanum cobaltite powder by drying a precipitate produced by adding sodium hydroxide to lanthanum nitrate and the cobalt nitrate aqueous solution and calcining the precipitate in the air at 700° C. for 6 hours. Examples of another method of manufacturing lanthanum cobaltite powder include a method of manufacturing lanthanum cobaltite powder by forming lanthanum nitrate and a cobalt nitrate aqueous solution, uniformly mixing lanthanum nitrate and the cobalt nitrate aqueous solution with a mixture of an acrylamide monomer and N,N'-methylenebiacrylamide, adding ammonium persulfate thereto to form a gel, and performing heating.

It is preferable that the particle diameter of the lanthanum cobaltite powder synthesized by the method selected from the aforementioned manufacturing methods be 0.5 to 5.0 μm. If the particle diameter is smaller than 0.5 μm, after the powder is heat treated at 1400° C. or more to grow the lanthanum cobaltite particles, the powder may be pulverized and then used.

However, in the case where the particle diameter is less than 0.5 μm, a high cost is required to manufacture the lanthanum cobaltite powder, which is not economical. Further, in the case where the particle diameter thereof is more than 5 μm, sintering required for the ceramic material is interrupted, thus resultantly negatively affecting shrinkage ratio and electrical conductivity.

This effect is confirmed by a method of adding lanthanum cobaltite to be described below and a change in shrinkage ratio and electrical conductivity according to the addition ratio thereof.

Since lanthanum cobaltite is not substantially sintered at 700 to 900° C. that is an operation temperature of the solid electrolyte fuel cell, if the particle diameter thereof is excessively large or the addition ratio is excessively high, shrinkage ratio and electrical conductivity of the composite ceramic material are reduced.

In addition, it is preferable that the addition ratio of lanthanum cobaltite be selected to be 10 wt % or more and 90 wt % or less in the finally obtained composite ceramic material. In the case where the addition ratio of lanthanum cobaltite is less than 10 wt %, an improving effect of conductivity is small, and in the case where the addition ratio is more than 90%, since the ceramic material is not sintered at the operation temperature of the solid oxide fuel cell, strength is significantly reduced, and as a result, the ceramic material may be easily broken.

Hereinafter, a method for manufacturing the composite ceramic material according to the exemplary embodiment of the present invention will be described.

First, the nitrate aqueous solution is manufactured by the following method. Nitrates such as lanthanum nitrate, calcium nitrate, chrome nitrate, cobalt nitrate and copper nitrate are weighed to correspond to a stoichiometric composition of the $ABO_3$ perovskite ceramic, added to distilled water to be dissolved therein, agitated at low temperatures, and heated. Further, the prepared lanthanum cobaltite powder is added to the prepared citric acid (citric acid monohydrate), uniformly mixed therewith, and then added to the nitrate aqueous solution to perform solation.

The mixed solution of the sol state is gelated by slowly being heated to increase viscosity, and continuously heated until agitation cannot be performed.

Thereafter, if the heating temperature is further increased to finish gel bubbling and form a viscous cake state, heating is performed to the self-ignition temperature of the solidified gel or more so that the gel is self-ignited to be combusted, and cooling is performed.

After the chars manufactured as described above are dry-pulverized and then clacined in the air at 700° C. or more. In this case, it is preferable that the calcining temperature be 700° C. or more that is a temperature at which a perovskite single phase is confirmed through an X-ray diffraction analysis and 1000° C. or less that is a temperature at which calcined powder is not sintered.

The shape of the calcined powder is a shape where the perovskite ceramic particles finally formed by the nitrate aqueous solution surround the lanthanum cobaltite particles having a particle diameter that is larger than that of the perovskite ceramic particles. This structure is called a cored structure.

In this case, it is preferable that the particle diameter of lanthanum cobaltite be 0.5 to 5.0 μm and the particle diameter of the perovskite ceramic particles synthesized together to surround the lanthanum cobaltite particles be 100 nm or less.

It is preferable that the aforementioned cored structure be maintained even though a subsequent physical process such as ball-milling is performed.

The calcined powder was put into a plastic jar together with ethanol and a zirconia ball, ball-milled, dried, and distributed.

The calcined powder manufactured by the aforementioned method is uniformly mixed by adding a combining material, dried, shaped, and sintered while being in contact with both sides of the electrode plate and the separation plate of the solid oxide fuel cell to be used as the composite ceramic material.

In this case, it is preferable that the sintering condition be 600° C. or more and 1 hour or more. If the sintering temperature is lower than 600° C., strength of a sintered body is not sufficient, such that the sintered body is broken and a function of a contact material is lost. If the temperature is higher than the aforementioned temperature range, the temperature is advantageous with respect to strength shrinkage of the ceramic material, but damage to other constituent elements constituting the fuel cell, for example the metal separation plate or the glass sealing material, is increased.

That is, if the ceramic material of the present invention is sintered at 600° C. or more that is the operation temperature range of the solid oxide fuel cell for 1 hour or more, a function thereof is exhibited. In the case where the temperature is increased as compared to the sintering temperature or a sintering time is increased, a microstructure of the ceramic material may be denser.

The manufactured calcined powder may be uniformly mixed together with an appropriate combining material, dispersion material, solvent and the like to obtain a viscous fluid (slurry) form, extruded in a linear state or a surface state on the solid oxide fuel cell single cell (unit cell) or the separation plate (interconnect), and sinter-attached to be used as the ceramic material.

As another use example, a paste is manufactured by mixing the manufactured calcining powder with an organic combining agent and a dispersing agent, applied on the solid oxide fuel cell separation plate, dried, sintered, and attached to the separation plate to be used as the ceramic material.

Hereinafter, Examples of the present invention will be described in detail.

Example 1

First, lanthanum cobaltite was synthesized as one of starting materials.

To this end, lanthanum oxide and cobalt oxide were mixed, and heated at the temperature of 1400° C. for 5 hours or more to synthesize lanthanum cobaltite. The synthesized lanthanum cobaltite was pulverized to form a powder state. The manufactured powder of lanthanum cobaltite was manufactured to have a dense and spherical shape without pores between primary particles as shown in the picture taken by the scanning electron microscope (SEM) of FIG. 1. The average particle diameter of the manufactured lanthanum cobaltite was about 3 μm.

Next, the nitrate aqueous solution was manufactured. The composition of the nitrate aqueous solution was adjusted by weighing and mixing nitrates so that the composition of the finally formed perovskite ceramic was $(La,Ca)(Cr,Co,Cu)O_3$ (hereinafter, referred to as 'LCCAF'). The accurate composition of LCCAF used in the present Example was $(La_{0.8}Ca_{0.2})(Cr_{0.1}Co_{0.6}Cu_{0.3})O_3$.

76.9 g of lanthanum nitrate, 10.4 g of calcium nitrate, 8.9 g of chrome nitrate, 38.5 g of cobalt nitrate, and 16.0 g of copper nitrate were added to 50 mL of distilled water in order to manufacture the nitrate aqueous solution having the aforementioned composition, completely dissolved therein, and heated to 70° C. while being agitated.

Thereafter, 50.0 g of the lanthanum cobaltite powder manufactured thusly was added to 85.0 g of the citric acid (citric acid monohydrate) that is powder at room temperature and uniformly mixed, and the mixture was then added to the nitrate aqueous solution.

The mixed solution in the aforementioned state was continuously heated at 70° C. until it was impossible to perform agitation because of the increased viscosity. Thereafter, the heating temperature was increased to 150° C. to finish gel bubbling and form a viscous cake state. If the cake state was formed, the gel solidified by heating the cake to 250° C. or more was self-ignited to be combusted, and the char was obtained by cooling the combusted gel. The char thusly obtained was dry-pulverized in the ball mill. Thereafter, the char was dried, heated at the temperature increase speed of 2° C./min, and clacined in the air at 700° C. for 4 hours.

Figure 2:
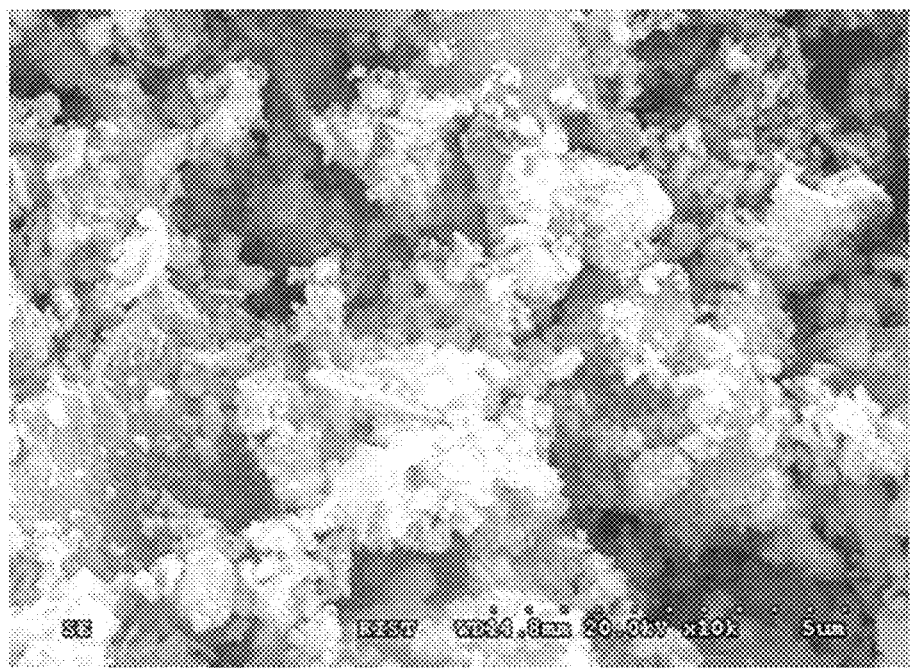
FIG. 2 is a picture of the composite ceramic material manufactured according to the exemplary embodiment of the present invention, which is taken by a field emission scanning electron microscope (FESEM).

The powder synthesized by the aforementioned method was shown in FIG. 2.

As seen from FIG. 2, the composite powder obtained by synthesizing the nitrate aqueous solution and the lanthanum cobaltite particles have a shape where small particles surround large particles. This structure is called a cored structure. The particle having the large particle diameter is lanthanum cobaltite and the particle diameter thereof is 2 to 5 μm, and the particles having the small particle diameter are LCCAF and the particle diameter thereof is about 50 nm.

It is preferable that the aforementioned cored structure be maintained even though a subsequent physical process such as ball-milling is performed. Accordingly, in the case where the calcined particles are ball-milled, it is necessary to control a ball-mill process so that the agglomerated LCCAF particles are pulverized to be uniformly dispersed around the lanthanum cobaltite particles.

The calcined powder was put into the plastic jar together with ethanol and the zirconia ball, ball-milled for 15 hours, and dried at 60° C. for 24 hours or more. The dried powder was distributed into the size of 150 μm or less.

The sample where lanthanum cobaltite was simply mixed with the LCCAF synthetic powder separately synthesized by using the nitrate aqueous solution and the citric acid was prepared in order to compare physical properties of the synthetic ceramic calcined powder manufactured by the aforementioned process. Hereinafter, the powder synthesized to have the cored structure according to the exemplary embodiment of the present invention is called "synthetic powder", and the powder obtained by simply mixing LCCAF powder synthesized by a separate process and lanthanum cobaltite is called "mixed powder".

Samples that are synthesized or mixed by changing the addition ratio of lanthanum cobaltite to the final ceramic powder to 10 to 90 wt % were calcined under the same condition in order to compare physical properties of the synthetic powder and the mixed powder. The calcining conditions of the powders were all 700° C. and 12 hours. The calcined powder was mixed with an organic binder through pulverizing, shaped, and sintered. In this case, the sintering condition is 850° C. and 4 hours.

The following Table 1 shows results obtained measuring sintering shrinkage of the sintering process with respect to the aforementioned experiment condition and the sintered body and electrical conductivity at 800° C. that is the operation temperature range of the solid oxide fuel cell. In this case, after the sintered sample was processed into prism having a size of 3*3*20 (mm), electrical conductivity thereof was measured at 800° C. by the four-probe method.

TABLE 1

| | Lanthanum cobaltite ratio (wt %) | | | | | | | | | |
|---|---|---|---|---|---|---|---|---|---|---|
| | 10 | | 30 | | 50 | | 70 | | 90 | |
| Classification | Synthetic powder | Mixed powder | Synthetic powder | Mixed powder | Synthetic powder | Mixed powder | Synthetic powder | Mixed powder | Synthetic powder | Mixed powder |
| Shrinkage (%) | 8.9 | 5.8 | 16.6 | 10.9 | 14.4 | 10.9 | 6.4 | 4.3 | 2.5 | 1.3 |
| Electrical conductivity (S/cm) | 111.8 | 75.5 | 192.1 | 101.5 | 228.4 | 180.5 | 117.2 | 94.2 | 100.2 | 88.3 |

As shown in Table 1, it can be seen that in the case of the synthetic powder, sintering shrinkage and electrical conductivity are higher than those of the mixed powder. Accordingly, the synthetic powder according to the exemplary embodiment of the present invention has excellent sintering property and electrical conductivity as compared to the mixed powder.

The experimental results mean that since the sintering property of the synthetic powder according to the present invention is significantly improved, in the case where the synthetic powder is used as a contact material in the separation plate of the solid oxide fuel cell, a dense network structure can be maintained.

Further, the synthetic powder according to the present invention improves a flow of electrons at a contact point of the lanthanum cobaltite particles to reduce electrical resistance of the ceramic material, as a result, the total electrical conductivity of the fuel cell stack is improved.

Example 2

In Example 2, the amount of synthetic powder manufactured according to Example 1 was increased to be 250 g in one batch, and physical properties with pure LCCAF powder were compared. (The amount of synthetic powder synthesized in Example 1 is 100 g in one batch.)

First, pure LCCAF powder was synthesized by adding only the citric acid to the nitrate aqueous solution weighed in a stoichiometric composition. In addition, synthetic powder was synthesized by the same method as Example 1 for the purpose of comparison therewith. In this case, the composition of lanthanum cobaltite in synthetic powder was set so that the ratio of lanthanum cobaltite in powder obtained after calcining was 50 wt %. Hereinafter, synthesized LCCAF powder is called "pure LCCAF powder", and synthetic powder synthesized for comparison is called "50% synthetic powder".

The powders synthesized as described above were shaped into disks having the diameter of 25 mm by each adding 1.0 wt % of polyvinylbutyral and performing uniaxial pressing to 1,000 kgf/cm². The shaped bodies were sintered in the air at 850° C. for 4 hours. In this case, the shrinkage was measured during sintering. In addition, the sintered body was processed into prism having the size of 3*3*20 (mm), and electrical conductivity was then measured by the four-probe method at 800° C.

Shrinkage and electrical conductivity during sintering were 16.2% and 64.3 S/cm, respectively, in the case of pure LCCAF powder, and 18.6% and 505.2 S/cm, respectively, in the case of 50% synthetic powder.

Since lanthanum cobaltite powder was not substantially sintered at 800° C., sintering shrinkage of synthetic powder including 50 wt % of lanthanum cobaltite powder was lower than sintering shrinkage of pure LCCAF. However, since electrical conductivity is increased by four times, sintering shrinkage is reduced by 1.8% point, thus compensating a reduction effect of electrical conductivity.

Example 3

In Example 3, synthetic powder manufactured according to Example 2 was applied as a contact material to the separation plate of the solid oxide fuel cell, and electric characteristics of the fuel cell were examined.

The sample used in this experiment is 50% synthetic powder synthesized according to Example 2.

Synthesized 50% synthetic powder, the organic combining material, the dispersion material and the solvent were mixed with each other to manufacture the slurry.

This slurry was put into the syringe-shaped container, and applied in a linear form on the solid oxide fuel cell separation plate by using a dispenser device. Further, this was sintered in the air at 850° C. for 4 hours.

In the used solid oxide fuel cell, the single cell was formed of LaSrCoFeO₃ (LSCF) anode, yttria stabilized zirconia (YSZ), and Ni—YSZ cathode, the separation plate was formed of a stainless steel material (ferritic steel), and the sealing material was glass.

In this case, while the current collector formed between the separation plate and the anode was changed, a current voltage characteristic of the fuel cell was examined.

The used current collectors were compared with respect to the three cases of use of 1) a ceramic material manufactured according to Example 3, 2) a contact material formed of a platinum mesh (Pt mesh) and a platinum paste (Pt paste) and 3) a metal mesh manufactured by the ferritic steel-based stainless alloy and electroplated with Co—Ni.

Figure 3:
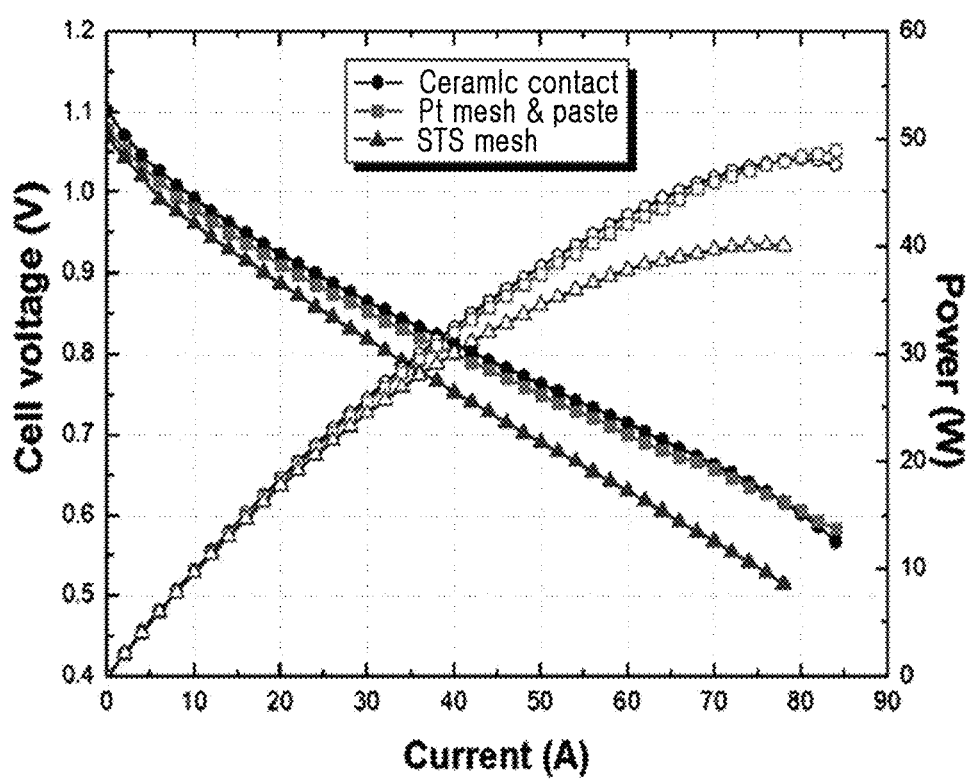
FIG. 3 is a picture illustrating current-voltage curved line and current-electric power curved line graphs of a solid oxide fuel cell to which the composite ceramic material manufactured according to the exemplary embodiment of the present invention is applied.

With respect to the three types of fuel cells, the examination results of current-voltage characteristics are shown in FIG. 3.

As seen from FIG. 3, it can be seen that the solid oxide fuel cell using 1) the ceramic material manufactured according to Example 3 has the same or higher electric characteristic as compared to the case where 2) the platinum mesh and the platinum paste are used.

However, as compared to the case where the metal current collector of 3) is used, the metal current collector of 3) exhibits performance of about 94% as compared to 1) the ceramic material manufactured according to Example 3.

Accordingly, in the case where 2) the platinum mesh and the platinum paste are used, costly platinum is used, but in the case of 1) the ceramic material, since performance is the same and the cost is low, the ceramic material is advantageous in view of industrial applicability.

Example 4

In Example 4, the mixed powder having the same composition as "50% synthetic powder" of Example 2, that is, powder manufactured by simply mixing separate LCCAF powder and lanthanum cobaltite, was sintered, and sintering shrinkage and electrical conductivity thereof were compared.

To this end, in the mixed powder, after pure LCCAF powder was manufactured in a separate process, lanthanum cobaltite powder was weighed and simply mixed therewith so that the ratio was 50 wt %. (hereinafter, referred to as "50% mixed powder")

Each powder prepared thusly was mixed with 1 wt % of polyvinylbutyral, ball-milled, and dried. Thereafter, shaping and sintering were performed by the same procedure as Example 2, and shrinkage and electrical conductivity were measured.

As a result, shrinkage and electrical conductivity of 50% synthetic powder were 18.6% and 505.2 S/cm and shrinkage and electrical conductivity of 50% mixed powder were measured to be 10.9% and 180.5 S/cm, respectively.

As described above, shrinkage and electrical conductivity of 50% mixed powder were lower than those of 50% synthetic powder. The results show that there is a large difference in physical properties according to a synthetic state thereof rather than the composition ratio of LCCAF powder and lanthanum cobaltite powder. This result can be confirmed in the aforementioned Table 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a composite ceramic material, comprising:
   adding a mixture where citric acid and lanthanum cobaltite powder are mixed with each other to a nitrate aqueous solution where a plurality of nitrates are dissolved to form a mixed solution containing a reactant in a sol state;
   heating and agitating the mixed solution to convert the reactant from a sol state to a gel state;
   heating the reactant in the gel state to a temperature of a self-ignition or more of the citric acid to combust the citric acid and produce chars; and
   pulverizing the chars produced by the combustion of the citric acid and then calcining the chars at 700° C. or more to form a calcined powder.

2. The method of manufacturing a composite ceramic material of claim 1, wherein:
   a particle diameter of the lanthanum cobaltite powder is 0.5 to 5.0 μm.

3. The method of manufacturing a composite ceramic material of claim 1, wherein:
   the nitrate aqueous solution is obtained by dissolving at least two metal nitrates selected from lanthanum nitrate, calcium nitrate, chrome nitrate, cobalt nitrate, copper nitrate, iron nitrate, bismuth nitrate, yttrium nitrate, manganese nitrate, strontium nitrate and nickel nitrate in distilled water to correspond to a composition of a $ABO_3$ perovskite ceramic.

4. The method of manufacturing a composite ceramic material of claim 1, wherein:
   a ratio of the lanthanum cobaltite added to the nitrate aqueous solution is greater than 10 wt % and less than 90 wt %.

5. The method of manufacturing a composite ceramic material of claim 4, wherein:
   the manufactured composite ceramic material is a $ABO_3$ perovskite ceramic selected from the group consisting of $(La,Sr)MnO_3$, $(La,Sr)CoO_3$, $(La,Sr)(Co,Fe)O_3$, and $(La,Ca)(Cr,Co,Cu)O_3$.

6. The method of manufacturing a composite ceramic material of claim 5, wherein:
   a composition of the $(La,Ca)(Cr,Co,Cu)O_3$ is $(La_{0.8}Ca_{0.2})(Cr_{0.1}Co_{0.6}Cu_{0.3})O_3$.

7. The method of manufacturing a composite ceramic material of claim 1, wherein:
   the citric acid is a combustible organic material contributing to forming a metal complex and forming ceramic powder by combustion at high temperatures.

8. The method of manufacturing a composite ceramic material of claim 7, wherein:
   the combustible organic material is any one of glycine nitrate, polyethylene glycol, urea and ethylenediamine tetraacetate.

9. The method of manufacturing a composite ceramic material of claim 1, further comprising:
   uniformly mixing the calcined powder, a combining material, a dispersion material and a solvent to manufacture a viscous fluid.

10. The method of manufacturing a composite ceramic material of claim 9, further comprising:
    applying the viscous fluid on a polar plate or a separation plate of a fuel cell and then sintering the viscous fluid.

11. The method of manufacturing a composite ceramic material of claim 10, wherein:
    the sintering is performed at 600° C. or more for 1 hour or more.

* * * * *